Feb. 23, 1960 K. C. ALLEN 2,926,295
PULSING MOTOR SYSTEM
Filed Jan. 7, 1957
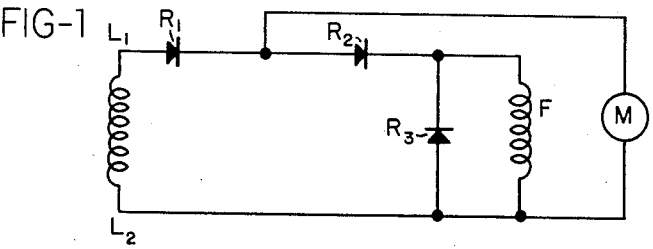
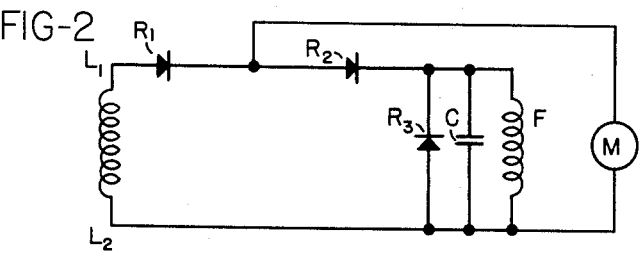
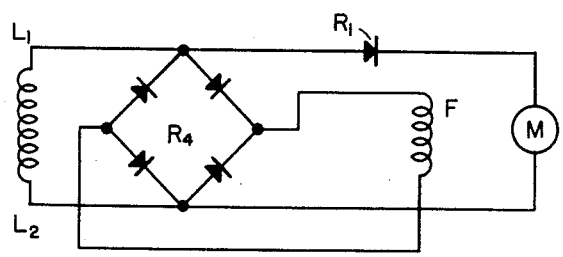
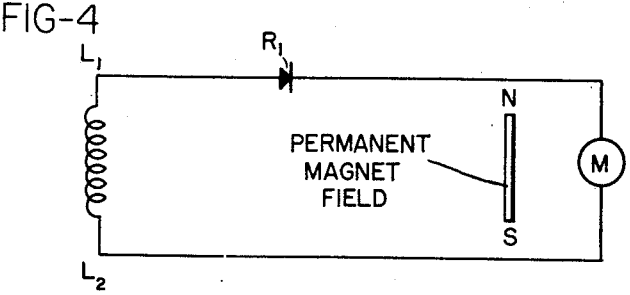
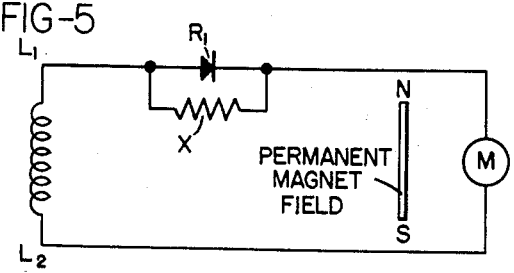
*INVENTOR.*
KENNETH C. ALLEN
BY
*Marechal, Biebel, French & Bugg*
ATTORNEYS

2,926,295

PULSING MOTOR SYSTEM

Kenneth C. Allen, Dayton, Ohio, assignor to The Hobart Manufacturing Company, Troy, Ohio, a corporation of Ohio Application January 7, 1957, Serial No. 632,862

1 Claim. (Cl. 318—506)

This invention relates to electric motors and more particularly to a motor system for developing pulsating power.

In servo applications it is particularly advantageous to have a motor which develops power in a series of impulses as distinguished from continuously, since this tends to provide for greater sensitivity in the operation of the device or element to which the power is delivered. Where the pulsing effect is thus developed electrically within the motor, it is comparable to what is accomplished mechanically by tapping a part to bring it accurately into a predetermined position. It is well recognized that a part may be moved into accurate relation upon another more readily by such a mechanical tapping in a series of blows of small impact than if it were to be moved in a continuous motion and attempted to be stopped when the correct or predetermined position was reached.

In the case of the servo, where the motor is constructed to drive an indicating device, for example, the fact that the motor of this invention develops its power in a series of pulses makes for a high degree of accuracy in the response of the driven element, and assures that it will more accurately and quickly be brought into the desired ultimate position, with more certainty than if the motor operated to drive the element with a continuous force.

It is accordingly a principal object of the invention to provide a motor and motor control system adapted to be energized from an alternating current supply and to develop power in a series of pulses.

It is a further object to provide such a pulsing power system which is simple in construction, free of rotating or moving parts in its control circuit, and which is reliable and satisfactory in operation.

It is also an object to provide a method of operating a motor to develop pulsating power impulses therefrom.

Other objects and advantages will be apparent from the following description, the accompanying drawing, and the appended claim.

In the drawing—

Fig. 1 is a diagrammatic view showing one form of circuit for the motor using a rectifier in the field winding circuit;

Fig. 2 is a view showing use of a condenser supplementing the rectifier of Fig. 1;

Fig. 3 is a view showing how the field may be energized through a full wave rectifier;

Fig. 4 is a view showing use of a permanent magnet field; and

Fig. 5 is a diagrammatic view showing a modified circuit for overcoming the mechanical inertia of the motor armature and the elements driven thereby.

The motor utilized is essentially a direct current shunt type having an armature A and a field winding F for producing a magnetic flux. Means are provided for maintaining a continuing unidirectional magnetic flux through the motor field while the armature is supplied with current through rectifier means which supplies half wave rectified current from the source. With the field flux being thus maintained, and the current to the armature being supplied as a series of spaced unidirectional impulses, the armature develops pulsating power impulses which accomplish the desired result, making it possible to operate at slow speed and to achieve accuracy of rotation and high precision in the final positioning of the element driven by the motor.

Various different arrangements may be provided for supplying the magnetic field. Thus as shown in Fig. 1 provision is made for a continuing flow of current in a local circuit through the field during the half cycles when power from the supply lines is blocked. Referring more particularly to Fig. 1, a source of alternating current is indicated at $L_1$, $L_2$ which may be the secondary of a transformer the primary P of which is supplied from any suitable source such as a 60 cycle power line. The presence of the transformer is unnecessary except where it is desired to supply power to the motor at a voltage different from that of the supply lines.

The field winding F of the motor is connected to $L_1$ through two rectifier means $R_1$ and $R_2$, in series with both of such rectifiers and its opposite side is connected directly to $L_2$. While any suitable rectifiers may be employed, dry contact devices are preferred for this purpose. A third rectifier means $R_3$ is connected across the field F and in a direction as indicated such as to block current flow from the supply lines, but to allow a circulating current to flow through the field winding. The armature M of the motor is connected as shown to a point intermediate $R_1$ and $R_2$, with its other side being connected to the opposite side of the power supply $L_2$.

The system operates in the following manner. During alternate half cycles current flows from $L_1$ through $R_1$ and $R_2$ into the field winding F, building up a magnetic field and storing energy therein. Such flow is blocked during the other half cycles. However as the current flow through the field stops and the flux starts to decay the change of flux induces a current in the field winding in the same direction as the original current flow and this current finds a path through rectifier $R_3$ so that a circulating current flows during such other half cycles. Thus under the energy stored in the field a current flow continues through the field winding and a unidirectional magnetic field is maintained throughout the entire period.

The armature can receive current from the supply line $L_1$ through $R_1$ only during alternate half cycles and any tendency for recirculating current to flow through the armature is blocked by the action of $R_2$. Hence half wave rectified current is supplied to the armature and current flows therein for only the intervals corresponding to the alternate half cycles.

The motor thus develops torque in response to the continuously energized field and the pulsating flow of current in the armature, resulting in pulsating power impulses which are smoothly initiated and terminated, and which thus are delivered to the output shaft of the motor to develop the pulsing power output desired.

Fig. 2 shows a circuit combining the condenser C and rectifier $R_3$. The condenser functions to store an electrostatic charge during the period when the circuit through $R_1$ and $R_2$ is conductive, and provides a local circuit for a circulating current through the field winding to maintain a current flow therethrough and thus to assure maintenance of a continuing magnetic flux in the field. This circuit has been found to give improved operating results and to provide for maintaining a more nearly uniform current flow through the field than when either the rectifier or the condenser is used alone. It is also found to be advantageous to employ the condenser C under any condition in which the armature of the motor will be required to absorb mechanical energy through dynamic braking. In dynamic braking the flow of the current through the armature reverses, and analysis of the circuit will show that such current flow will tend to increase the field flux and that the condenser absorbs surges and provides for more uniform operation.

Fig. 3 shows a further modified arrangement in which the armature of the motor is supplied in the same manner as before through rectifier $R_1$ but in which the field is energized from full wave rectifier $R_4$. Such full wave rectification provides a maintained field excitation and gives a highly satisfactory operation of the armature with the pulsing impulses developed therein.

Fig. 4 shows a further modification in which the field flux is provided by a permanent magnet with the armature being supplied through half wave rectifier $R_1$. Since a permanent magnet is used rectifiers $R_2$ to $R_4$ and condenser C may be eliminated, with a similar development of pulsating power impulses.

The system is simple and reliable in operation, does not require moving switches or contacts, and has been found to produce highly satisfactory results for the purpose described.

In some cases it may be desirable to reduce or overcome the effect of mechanical inertia in the motor armature system so that each power impulse produces its effect independently of preceding pulses, thus overcoming the inertia effect which might otherwise be present in the armature and the parts driven thereby as a result of being placed in motion. This is accomplished by the provision of a resistance X, connected as shown in Fig. 5 across rectifier $R_1$. It will be understood that the same resistance may be utilized in any of the circuit arrangements shown herein. Analysis of this circuit will show that in addition to the current impulses transmitted through the half wave rectifier $R_1$, which may be thought of as positive pulses, the resistance X allows a smaller current to flow during the alternate half cycles and in the opposite direction. Such current impulses will thus tend to produce power pulses in the opposite or negative sense in the armature. By suitable selection or variation of the amount of such resistance, these opposing or negative pulses may be regulated to partially or wholly counterbalance the inertia of the system and thus render the positive power impulses essentially independent of each other.

While the forms of apparatus herein described constitute preferred embodiments of the invention, it is to be understood that the invention is not limited to these precise forms of apparatus, and that changes may be made therein without departing from the scope of the invention which is defined in the appended claim.

What is claimed is:

An electric motor having an armature and a field and adapted to develop pulsating power when energized from an alternating current power source which comprises means for maintaining a continuing unidirectional magnetic flux through said motor field, means for supplying half wave rectified current from said source to said armature to develop pulsating power impulses therein, and means for supplying a series of smaller current impulses from said source to said armature in the opposite direction in the intervals between said flow of rectified current to produce small oppositely acting power impulses therein substantially balancing the inertia effect of said armature.

References Cited in the file of this patent

UNITED STATES PATENTS

| | | |
|---|---|---|
| 2,528,688 | Chin et al. | Nov. 7, 1950 |
| 2,559,724 | Lobosco | July 10, 1951 |
| 2,574,976 | Knauth et al. | Nov. 13, 1951 |
| 2,710,358 | Reeves | June 7, 1955 |